(12) United States Patent
Jalan et al.

(10) Patent No.: US 10,892,951 B2
(45) Date of Patent: Jan. 12, 2021

(54) ADVANCED DEVICE MATCHING SYSTEM

(71) Applicant: Device42, Inc., West Haven, CT (US)

(72) Inventors: Rajneesh Jalan, Trumbull, CT (US); Joseph M. Schmitt, Branford, CT (US); Marco Simoes, Seymour, CT (US)

(73) Assignee: Device42, Inc., West Haven, CT (US)

( * ) Notice: Subject to any disclaimer, the term of this patent is extended or adjusted under 35 U.S.C. 154(b) by 13 days.

(21) Appl. No.: 16/380,086

(22) Filed: Apr. 10, 2019

(65) Prior Publication Data

US 2020/0328942 A1 Oct. 15, 2020

(51) Int. Cl.
*H04L 12/24* (2006.01)
*G06Q 10/06* (2012.01)
*G06K 9/62* (2006.01)

(52) U.S. Cl.
CPC ............ *H04L 41/12* (2013.01); *G06K 9/6201* (2013.01); *G06Q 10/063* (2013.01); *H04L 41/082* (2013.01); *H04L 41/0866* (2013.01)

(58) Field of Classification Search
CPC ............................. H04L 41/12; H04L 41/0853
See application file for complete search history.

(56) References Cited

U.S. PATENT DOCUMENTS

| | | | | |
|---|---|---|---|---|
| 2002/0071440 | A1* | 6/2002 | Cerami | H04N 21/6473 370/404 |
| 2005/0027832 | A1* | 2/2005 | Bavaria | G06F 13/102 709/220 |
| 2005/0094573 | A1* | 5/2005 | Shepard | H04L 41/12 370/254 |
| 2011/0258313 | A1* | 10/2011 | Mallik | H04W 8/005 709/224 |
| 2018/0302289 | A1* | 10/2018 | Shen | H04L 41/12 |

* cited by examiner

*Primary Examiner* — Melanie Jagannathan
(74) *Attorney, Agent, or Firm* — Wiggin and Dana LLP; Gregory S. Rosenblatt; Jonathan D. Hall (57) ABSTRACT

Disclosed is a device management system for discovery and management of components added to computer systems and sub-systems. The device management system provides for recognizing a newly added component, and determining if the newly added component is already a part of the system inventory. The newly added component is matched with a component currently on the system, based on at least one matching attribute. A point total is calculated for each match level and a final match score is provided. The match score is compared with an aggressiveness level to determine if a match does indeed exist.

19 Claims, 11 Drawing Sheets

| Level | Weight | Attribute | Existing Component | Newly Discovered Component |
|---|---|---|---|---|
| 1 | 10 | Device Name | Device1 | Deviceonesie |
| 1 | 10 | Serial No. | 123456 | 123456 |
| 1 | 10 | UUID | 98765 | 98765 |
| 1 | 10 | Device Aliases | DeviceOne<br>DeviceOne1<br>Deviceonesie | onedeviceblah<br>deviceblah<br>Deviceonesie |
| 1 | 10 | Cloud Instance IDs | | |
| 2 | 8 | Discovery target IP | 10.42.1.0 | 10.42.1.0 |
| 3 | 6 | IP addresses | 10.42.1.1<br>10.42.1.2<br>10.42.1.3 | 10.42.1.1<br>10.42.1.6<br>10.42.1.7 |
| 3 | 6 | Mac addresses | 00:E0:D8:12:E9:A2<br>00:0E:D3:00:53:B7<br>00:0E:D3:00:BF:C8 | 00:E0:D8:12:E9:A2<br>00:0E:D4:00:54:B9<br>00:0E:D6:07:BF:C3 |
| 4 | 4 | ID of discovery job | Vserver-3 | Vserver-3 |

803 — Level
805 — Weight
807 — Attribute
809 — Existing Component
811 — Newly Discovered Component

| Level | Weight | Attribute | Existing Component | Newly Discovered Component |
|---|---|---|---|---|
| 1 | 10 | Device Name | Device1 | Deviceonesie |
| 1 | 10 | Serial No. | 123456 | 123456-1 |
| 1 | 10 | UUID | 98765 | 98765-1 |
| 1 | 10 | Device Aliases | DeviceOne<br>DeviceOne1<br>Deviceonesie | onedeviceblah<br>deviceblah<br>Deviceonesieblahblah |
| 1 | 10 | Cloud Instance IDs | | |
| 2 | 8 | Discovery target IP | 10.42.1.0 | 10.42.15.5 |
| 3 | 6 | IP addresses | 10.42.1.1<br>10.42.1.2<br>10.42.1.3 | 10.42.1.10<br>10.42.1.6<br>10.42.1.7 |
| 3 | 6 | Mac addresses | 00:E0:D8:12:E9:A2<br>00:0E:D3:00:53:B7<br>00:0E:D3:00:BF:C8 | 00:E0:D8:12:E9:A7<br>00:0E:D4:00:54:B9<br>00:0E:D6:07:BF:C3 |
| 4 | 4 | ID of discovery job | Vserver-3 | Vserver-4 |

FIG. 9

| Level | Weight | Attribute | Existing Component | Newly Discovered Component |
|---|---|---|---|---|
| 1 | 10 | Device Name | Device1 | Deviceonesie |
| 1 | 10 | Serial No. | 123456 | 123456-1 |
| 1 | 10 | UUID | 98765 | 98765-1 |
| 1 | 10 | Device Aliases | DeviceOne<br>DeviceOne1<br>Devicemehmehmeh | onedeviceblah<br>deviceblah<br>Deviceonesieblahblah |
| 1 | 10 | Cloud Instance IDs | | |
| 2 | 8 | Discovery target IP | 10.42.1.0 | 10.42.15.5 |
| 3 | 6 | IP addresses | 10.42.1.1<br>10.42.1.2<br>10.42.1.3 | 10.42.1.10<br>10.42.1.6<br>10.42.1.7 |
| 3 | 6 | Mac addresses | 00:E0:D8:12:E9:A2<br>00:0E:D3:00:53:B7<br>00:0E:D3:00:BF:C8 | 00:E0:D8:12:E9:A7<br>00:0E:D4:00:54:B9<br>00:0E:D6:07:BF:C3 |
| 4 | 4 | ID of discovery job | Vserver-3 | snmp-4 |

FIG. 10

| Level | Weight | Attribute | Existing Component | Newly Discovered Component |
|---|---|---|---|---|
| 1 | 10 | Device Name | kvm-002.device42.pvt | kvm-002.device42.pvt |
| 1 | 10 | Serial No. | 123456 | 123456-1 |
| 1 | 10 | UUID | 98765 | 98765-1 |
| 1 | 10 | Device Aliases | DeviceAlist810<br>DeviceBlist810 | |
| 1 | 10 | Cloud Instance IDs | | |
| 2 | 8 | Discovery target IP | | 10.42.15.5 |
| 3 | 6 | IP addresses | 10.42.1.1<br>10.42.1.2<br>10.42.1.3 | |
| 3 | 6 | Mac addresses | 00:E0:D8:12:E9:A2<br>00:0E:D3:00:53:B7<br>00:0E:D3:00:BF:C8 | |
| 4 | 4 | ID of discovery job | vserver-8 | snmp-4 |

FIG. 11

ADVANCED DEVICE MATCHING SYSTEM

FIELD OF THE DISCLOSURE

The subject matter of the present disclosure generally relates to device management systems, and more particularly relates to device management and device discovery.

BACKGROUND OF THE DISCLOSURE

With the proliferation of computers, electronics and connected devices, it is increasingly difficult for companies to monitor and track their inventory.

Hardware components, such as computers, routers, and storage systems, and software, such as applications, database systems, and their associated data, are being deployed with increased rapidity. The amount of data currently generated in a business environment has led to increased demand for storage systems to store the data, computing devices to analyze it, and the necessary software to make sense of it.

Due to this growth, management, tracking, and accessing associated devices and systems is becoming increasingly important. Reduction of errors, outages and response times, and increased security protocols, are a necessary part of the systems of today.

Current systems and processes are utilized to discover devices and components on a network. In such processes, discovery involves finding devices and software across a network or series of interconnected networks. Often times, such networks are a hodgepodge of intranets, private networks, wireless networks and networks of all types. Such systems and devices often communicate across varied protocols, such as Internet Protocol (IP) versions 4 or 6, Internet Control Message Protocol (ICMP), Transport Control Protocol (TCIP), various packet exchange protocols or any other suitable communication protocols.

It would be desirable, therefore, to provide a system for identifying and managing the devices. It would be further desirable to provide a device management that is configured to automatically search for and identify new components, devices, software and/or systems.

It would yet be further desirable to provide a mechanism by which Information Technology (IT) administrators may document and understand their IT systems and their deployment. It is desired that such documentation be stored in a configuration management database (CMDB).

BRIEF SUMMARY OF THE DISCLOSURE

Disclosed is a device management system for discovery and management of components added to computer systems and sub-systems. The device management system provides for recognizing a newly added component and determining if the newly added component is already a part of the system inventory. The newly added component is matched with a component currently on the system, based on at least one matching attribute. A point total is calculated for each match level and a final match score is provided. The match score is compared with an aggressiveness level to determine if a match does indeed exist.

Current systems for discovering components are often overly-sweeping, and cause the "discovery" of components that are already a part of the system. That is, one problem with current systems is a creation of duplicate component and component records on the system. As a result, duplicate records, and erroneous CMDB record updates, occur. Not only does this inaccurately skew the system, but it causes mismanagement of computing power, duplication and misallocation of processing power, memory and resources, and increased cost. This also increases systemic risk, by not allowing for proper tracking of all components accessing a system.

Thus, the inventive process reduces or eliminates erroneous CMDB record updates, reduces the number of duplicate device records, and reduces the updates to incorrect or target devices. The inventive process also increases system transparency, and reduces risk of fraud and malicious activity.

The disclosed subject matter presents several advantages over previously available systems and methods.

BRIEF DESCRIPTION OF THE DRAWINGS

The foregoing summary, preferred embodiments, and other aspects of the subject matter of the present disclosure will be best understood with reference to a detailed description of specific embodiments, which follows, when read in conjunction with the accompanying drawings, in which.

Like reference numbers and designations in the various drawings indicate like elements. Arrows in the schematic drawings should be understood to represent logic pathways that are generally indicative of the flow direction of information or logic, and that such arrows do not necessarily represent traditional electrical pathways.

DETAILED DESCRIPTION OF THE DISCLOSURE

Provided herein are systems, devices and methods for device, software and/or system (hereinafter, collectively referred to as "component") discovery.

In an embodiment, the system utilizes auto-discovery to locate and record attributes of discovered components. Such attributes include, but are not limited to, computer networks, IP addresses, and physical, logical and server (including virtual server) instances running on those networks. The attributes are captured, with in-depth details documented. Discovered details for each attribute are then transmitted to be stored in a CMDB. The CMDB may be updated with each auto-discovery run.

It should be noted that in accordance with an embodiment, auto-discovery is not a one-time process. Thus, auto-discovery may be run at any suitable interval. For example, auto-discovery may be run at pre-set intervals, such as once a week, once a day or any other suitable period of time. In another example, auto-discovery may be run at random intervals, or when it is thought that new components may have been added.

Auto-discovery, in an embodiment, may locate and record attributes of discovered devices, such as, but not limited to, the domain name system (DNS) name, central processing unit (CPU) count, memory size and attributes (including random access memory (RAM), flash memory and/or other suitable memory) size, hard disk drive (HDD) size and attributes, and peripherals. Additional attributes include, but are not limited to IP addresses, MAC addresses, mount point, network shares, parts, ports, subnets, contained devices, VLANS, and cluster information. Auto-discovery may also locate and record any and all servers, software, services or any other suitable components, and which other components they communicate with.

Utilizing the inventive auto-discovery process, an administrator or other responsible individual or entity may then create one or more tasks for auto-discovery. For example, an administrator may provide one or more criteria that is easily obtainable and well-known, such as login details or a network sub-range. With this information, in an embodiment, auto-discovery may be initiated, without further input from an administrator.

Thus, the auto-discovery process allows for tracking components that access a computer system. This addresses a well-known problem of computing networks, namely, ensuring security and accountability of all components accessing a computer system, and is specifically configured to track and discover specific details relating to each component's access of the computer system.

The auto-discovery process is configured to run semi-autonomously. That is, once configured, the auto-discovery process does not require further input, and uses standard and native protocols to communicate with a wide range of components, such as simple network management protocol (SNMP) for network hardware, secure shell (SSH) for Linux-based devices, WMI/WinRM for Windows-based devices, FTP, ICMP, ping, telnet, TN3270 and any other suitable protocol.

The process is specifically configured to communicate across any and all layers, including application layer, transport layer, internet layer, and link layer, local access, of computer networks. Exemplary additional protocols within these layers, as contemplated by the invention for communication, are illustrated below in Table 1 (using conventional acronyms).

TABLE 1

| Application Layer | Transport Layer | Internet Layer | Link Layer |
|---|---|---|---|
| BGP | ATP | IP (IPv4, IPv6) | ARP |
| DHCP | TCO | ICMP | NDP |
| DNS | UDP | ICMPv6 | OSPF |
| FTP | DCCP | ECN | PPP |
| HTTP | SCTP | IGMP | MAC |
| HTTPS | RSVP | IPsec | IS-IS |
| IMAP | RUDP | | |

In an embodiment, the inventive process includes advanced device matching. As a part of auto-discovery, advanced device matching provides for an integrated discovery process. While auto-discovery is being run on a system, such as, for example, a cloud-based server, local server, or any suitable variation, devices are discovered. The advanced device matching algorithm, in accordance with the invention, processes the discovered components. For example, the devices are analyzed for any suitable identifying data, such as IP addresses, unique hardware or software identifiers, device names, brand names, device attributes, and any other suitable data. Identifying data may include, but is not limited to, device name, serial number, UUID, IP, MAC location, RACK, host, chassis, discovery job, cloud id, and any other identifying attribute found during discovery.

The auto-discovery process may then compare the newly/currently discovered component(s) to potentially existing components. For example, the process may first retrieve, from the system, a list or data of all components currently on, or connected to, the system. Utilizing this process, newly discovered components may then be matched to one of the existing components currently on or connected to the system.

In another example, the process may first receive one or more attributes of the newly discovered component(s). A list or one or more attributes of components currently on the system may then be retrieved. The components are then matched against one another.

In an embodiment, when retrieving existing components, only a limited subset of attributes may be retrieved. This may reduce the latency and data, processing or memory utilization, but can still provide sufficient details to accurately carry out the advanced device matching process.

In accordance with the invention, use of the advanced device matching process reduces or eliminates waste, inefficiencies, malicious or suspicious behaviors, and reduces errors. Utilizing the invention, a system may operate autonomously or semi-autonomously for extended periods of time systems, while providing documentation of system infrastructure and architecture, and reducing waste and inefficiencies. For example, due to the accuracy of the inventive matching system disclosed herein, an end user is not needed to look through device details for mismatches, as the system may easily identify them. In a further example, the system may run continuously for months or even years.

Current systems for discovering components are often overly-sweeping, and cause the "discovery" of components that are already a part of the system. That is, the problem with current systems is the creation of duplicate component and component records on the system. As a result, duplicate records, and erroneous CMDB record updates, occur. Not only does this inaccurately skew the system, but it causes mismanagement of computing power, duplication and misallocation of processing power, memory and resources, and increased cost. This also increases systemic risk, by not allowing for proper tracking of all components accessing a system.

Thus, the inventive process reduces or eliminates erroneous CMDB record updates, reduces the number of duplicate device records, and reduces the updates to incorrect or target devices. The inventive process also increases system transparency, and reduces risk of fraud and malicious activity.

Figure 1:
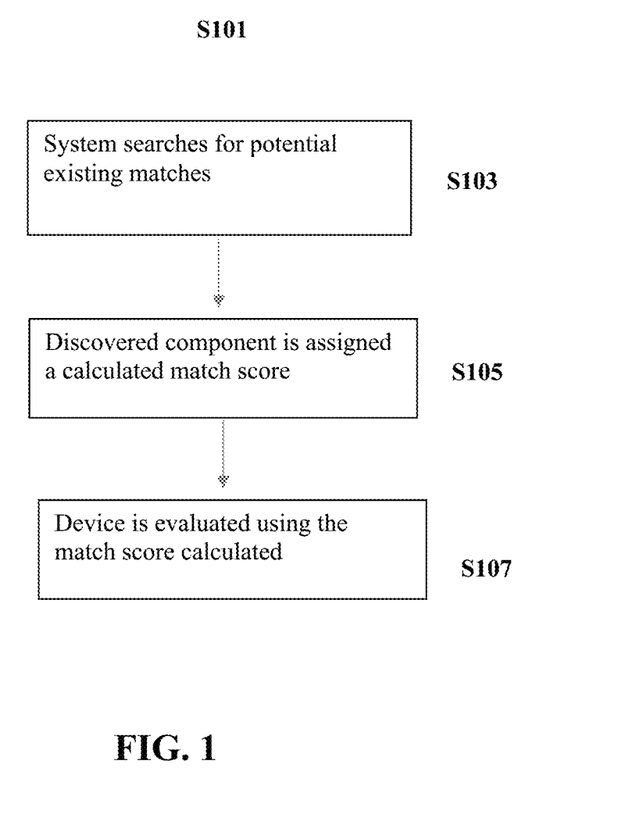
FIG. 1 is a diagram of an embodiment of a process of the invention, illustrating a matching process.

Referring now to FIG. 1, illustrated is an exemplary high-level overview of the device matching process 101.

At step S103, the system searches for existing potential matches.

At step S105, a discovered component is assigned a calculated match score.

At step S107, a device match is evaluated using the match score value calculated.

Figure 2:
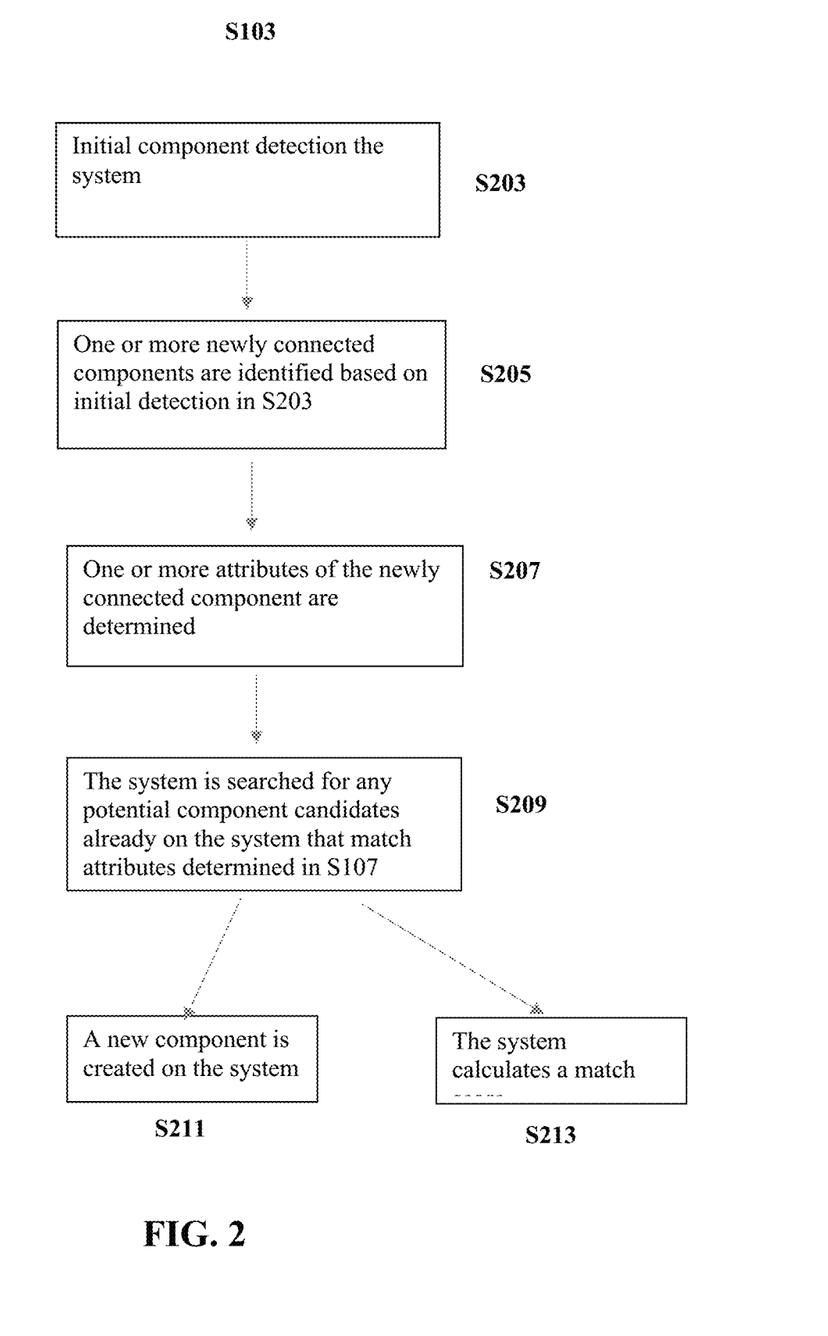
FIG. 2 illustrates an exemplary process of searching for potential existing matches, in accordance with an embodiment.

FIG. 2. illustrates the process of searching for existing potential matches, that of step S103, in further detail.

At step S203, an initial detection occurs on the system during the auto discovery process. This detection may be done by the system detecting a new IP address, new device identifier, new sub-network, new software license, or any other suitable connection or attribute being connected to, or accessing, the system.

At step S205, one or more newly connected components are identified, based on the initial detection in S203.

At step S207, one or more attributes of the newly connected component are determined.

At step S209, the system is searched for any potential component candidates, already in the system, that match the attributes determined in S107. For example, attributes for a device are stored in a separate meta table, optimized with Generalized Inverted Indexes for performance. If any potential component candidates are found, they are identified at S209.

If no potential component candidates with matching attributes are found, the system continues to step S211. At step S211, a new component is created on the system, based on those from the component initially detected, and its attributes cataloged and saved. If S211 occurs, once the new device is created, the process end.

If, in S209, it is determined that the new component detected on the system a potential match for an existing component, the system continues to step S213. At S213, the system calculates a match score.

Figure 3:
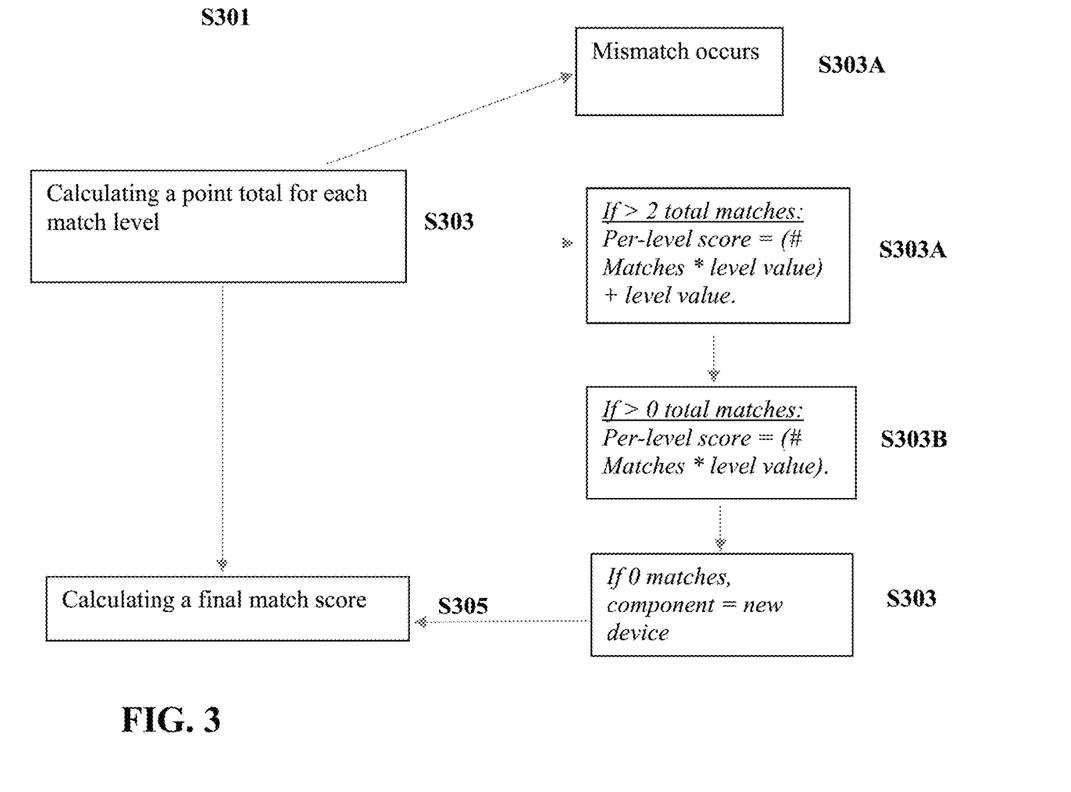
FIG. 3 illustrates an exemplary process for calculating a match score, in accordance with an embodiment.

FIG. 3 illustrates the match score calculation of S107/S213 in greater detail, in process S301. S301 determines a match score to be used in determining whether a discovered candidate component is indeed a "new" component on the system, whether it actually matches an existing component on the system, or whether there is an unclear conclusion either way (inconclusive).

At S303, a point total is calculated for each match level. For example, the system may be configured with match levels 1-4. Exemplary matching criteria reference values are illustrated below, in Table 2. The reference values illustrated are not meant to be exhaustive, and may include additional attributes. For example, the level may be used to identify the relative importance of matching attributes.

TABLE 2

| Level | Point Value | Attribute/Criteria |
| --- | --- | --- |
| Level 1 | 10 Points | Name |
| | | Serial Number |
| | | UUID |
| | | Device Alias |
| | | Cloud Instance IDs |
| Level 2 | 8 Points | Discovery target IP |
| | | FQDN |
| Level 3 | 6 Points | IP Addresses |
| | | MAC Addresses |
| Level 4 | 4 Points | ID of Discovery job (jobtype ID, e.g., server-1) |

Each component criteria is assigned a level, such as level 1-4. For example, the name or serial number of a component may be a criteria associated with Level 1, whereas an IP address may be associated with a Level 3. Thus, in an embodiment, each Level is valued differently, with a lower level associated with a lesser value, and a higher level associated with a higher value. That is, the criteria associated with each level are configured, such that the criteria associated with a lower level (i.e., level 1) are of lesser value in matching components, and are therefore assigned a lesser value (e.g., a matching IP address, in level 3, is considered to be of greater importance and therefore certainty in matching components than a device name, which is in level 1). In a further embodiment, each Level is valued differently, with a lower level associated with a higher value, and thus a higher score, whereas the higher level is associated with a lower value, and thus a lower score.

In a further example, additional and/or more granular match levels may be used, such as 1-10, or any other suitable number of match levels. The levels may be determined by analyzing existing data, and determining trends for importance in exercising the matching algorithm. Each level may be scored to create a final score for the entire device attributes.

In an embodiment, a total match score for the possible matching component criteria is calculated. The calculation sums all match level scores from each of the four or more levels. For example, the four match level scores are summed by multiplying each criteria match, by the assigned level value.

In a further example, this is illustrated by an example where name and serial number attributes are matched between the "new" component and a component currently on the system. In this example, each attribute, that of name and serial number, are each in Level 1, and in this example, Level 1 is assigned a value of 10 points. Thus, because there are two matches in Level 1, each being worth 10 points, there is a total summed value of 20 points. In a further example, where two attributes are matched, that of name (Level 1) and that of IP address (Level 3), the total summed value is 16, with 10 points for the one attribute in Level 1, and 6 points for the one attribute in Level 3.

At step 303A, if no matches are found, a mismatch occurs. Mismatches are calculated using the same value levels, but each mismatch results in a value that is negative, and is thus subtracted from the total score. For example, if the potentially matching attribute is name (Level 1), but it is determined that the name does not match, a negative 10 score (that of a Level 1 attribute) is assigned.

At S305, a final match score value is calculated, adding all calculations from step S303. Thus, the total value for each Level of levels 1-4 is calculated. The total for each of the four levels are then summed together, and this forms a match score.

Thus, in S303, the system implements advanced matching to calculate a match score, based on the number of total matches across all levels. The score is automatically increased using one of three formulas (S305A, S305B, S305C), based on the determined number of matches for criteria. For example, based on the quantity of matches, additional weight may be applied, causing the score to automatically increase.

At S303A, if there are greater than two matching attributes, the per level score is equal to the number of matches multiplied by the level value, and this is then added to the level value. Therefore, S303A can be summarized as: If>2 total matches: Per-level score=(#Matches*level value)+level value.

At S303B, if there are one or two matches, then the per level score is equal to the number of matches multiplied by the level value. Therefore, S303B can be summarized as: If>0 total matches: Per-level score=(#Matches*level value).

At S303C, if there are no matches, then the component is determined to be a new device, and no further calculation is needed. A new device is therefore created on the system.

As discussed above, the invention, in an embodiment, determines if a new component added to the system matches a component that is already a part of the system. The matching of the components may be any suitable criteria, such as device name, device IP address, device serial number, discovery job ID, or any other suitable criteria.

Referring back to FIG. 3, at step S305, the total match score is calculated using one of a plurality of match level scores.

In an embodiment, there may be four match level scores, or any other suitable amount of levels create to determine a proper match.

It should be noted that, for each mismatch, a deduction occurs, based on the level value.

Figure 4:
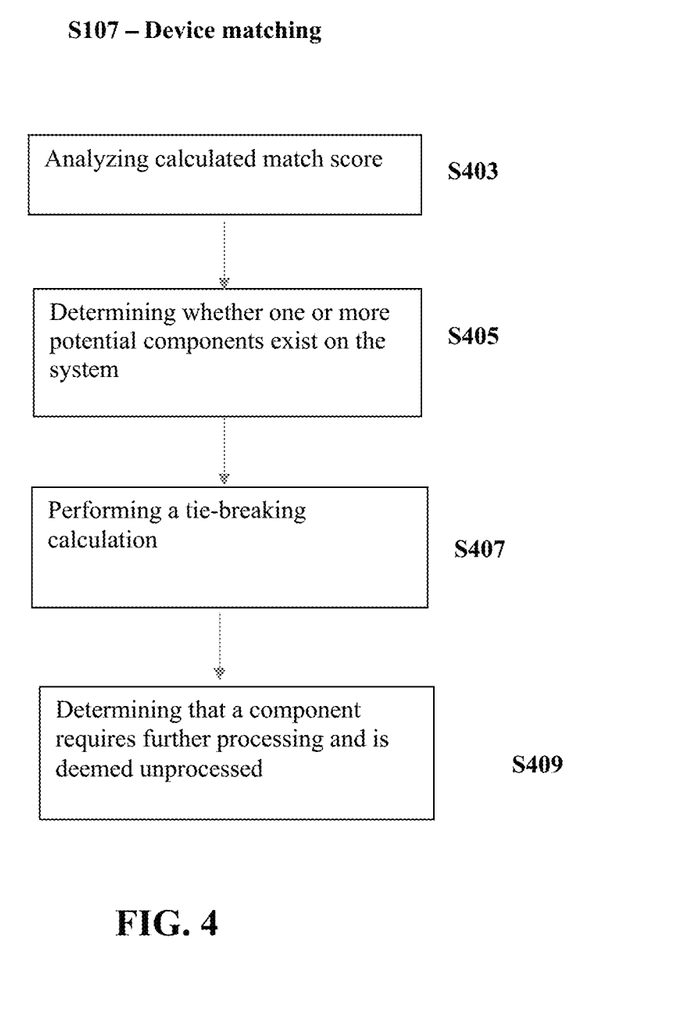
FIG. 4 illustrates an exemplary process for evaluating a match score, in accordance with an embodiment.

FIG. 4 illustrates device matching of S107, in greater detail.

At S403, the match score calculated in S213 is analyzed. The match score is compared with a pre-configured "matching aggressiveness" level. Thus, by comparing and analyzing the match score relative to the pre-configured matching level, the system can determine if the device is a match, with a certain degree of certainty. For example, an aggressiveness level may be set at 30 for conservative, 20 for moderate, 10 for aggressive, or any other suitable score. The aggressiveness of matching is may be set by the end user, based on their particular scenarios and topology of their environment. This level may be used to tune an environment to optimize matching.

In accordance with this embodiment, the match score of a potentially matching component is compared to those potential matches on the system in real-time or substantially real time. The matches are determined by comparing the calculated score of the newly added component against the matching aggressiveness setting. Thus, the system may be preconfigured, or may be configured at a suitable time, with an aggressiveness setting.

Figure 5:
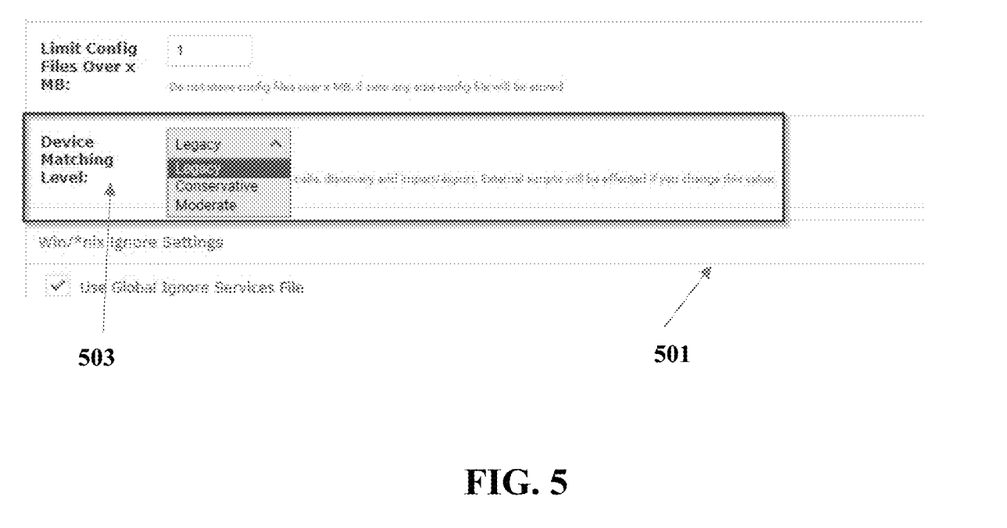
FIG. 5 is a diagram of an exemplary user interface, in accordance with an embodiment.

An exemplary view of the selection process for an aggressiveness setting is illustrated in FIG. 5. As shown in user interface 501, a desired matching level is selected from drop down menu 503.

Referring back to step S403, if the match score is greater than the matching aggressiveness score corresponding to the matching aggressiveness setting, the discovered component is marked as a match for the component already existing on the system.

At step S405, if the system determines that one or more potentially matching components on the system exist, the system conducts an additional tie breaking calculation, at step S407.

Thus, at S407, the two matches with the highest scores are considered. The match with the second highest score is subtracted from the match with the highest. If the difference between the two scores is less than the aggressiveness match level (i.e., if the difference between the value of the two scores is less than the 20, when a conservative matching level has been selected), the two potential matches are considered to be an "unmatched device" and therefore inconclusive.

Figure 6:
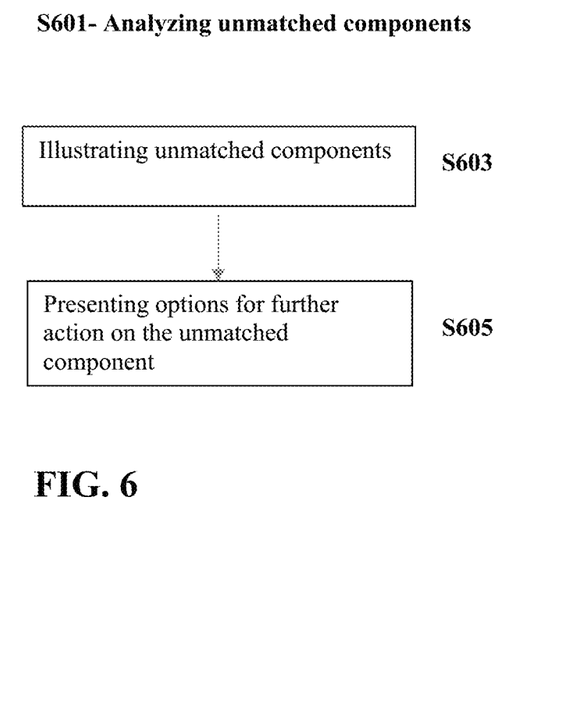
FIG. 6 illustrates an exemplary process for further processing of unprocessed devices, in accordance with an embodiment.

At step S409, the component with inconclusive matches is then moved for further processing into an unprocessed devices sub-process S601, illustrated in FIG. 6.

Referring back now to S407, if the difference between the two scores is greater than the match level, then the highest scoring potential component match is marked as a match on the system.

Referring now to FIG. 6, S601 is a process for analyzing and managing unmatched components, such as those determined at S407.

Figure 7:
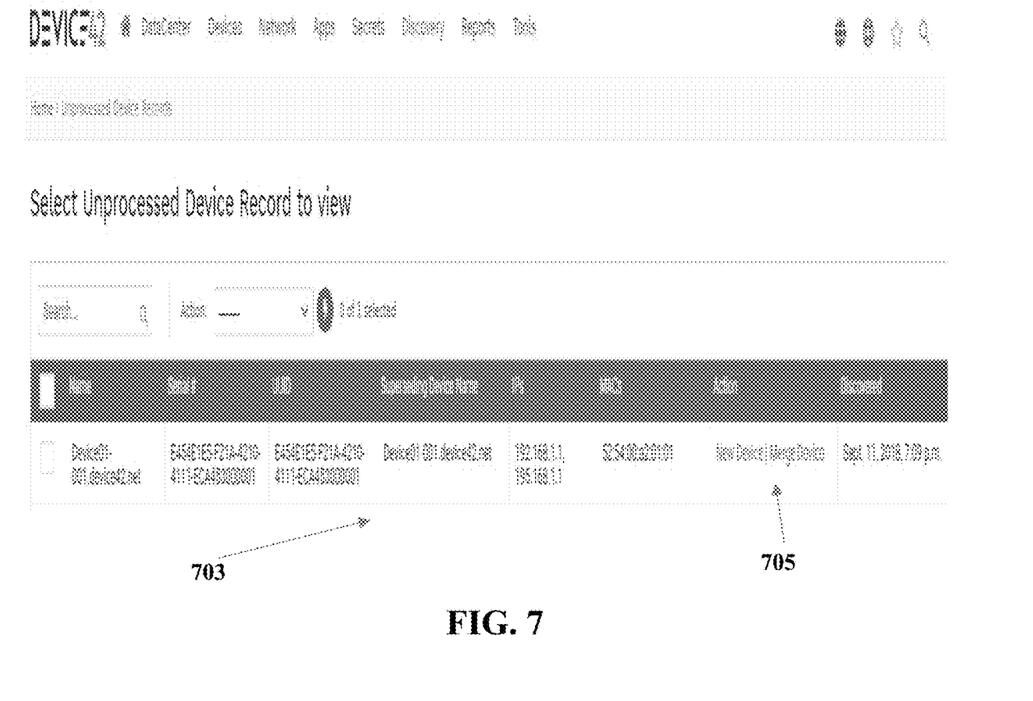
FIG. 7 illustrates an exemplary user interface, in accordance with an embodiment.

At step S603, a listing of the devices on the system that are tagged/coded as unmatched components are illustrated in a user interface, such as that shown in FIG. 7. FIG. 7 illustrates a user interface 701, with unprocessed device/component record 703. As shown, unprocessed device record 703 includes device identifying details including device name, serial number, UUID, superseding device name, IP address, MAC address, cloud ID, blade host, virtual host, job ID and other suitable attributes retrieved during discovery.

Device/component record 703 further includes a date of discovery of the device/component, as well as an "Action" column 705. Thus, at S605, a user can take further action to rectify the unmatched component.

Referring back to FIG. 7, the action column 705 provides actionable selections for the unmatched component. In an embodiment, as illustrated, a user may instruct the system to either register the component as a new component, or to merge the device with another existing component already on the system. In another embodiment, additional options may be provided, such as, for example, the option to remove the device.

If a user selects the option to merge the component, there may be multiple component candidates for merging. In that embodiment, the system may provide a pop-up or other notification, providing the merger options, and requesting a selection for merger.

Figure 8:
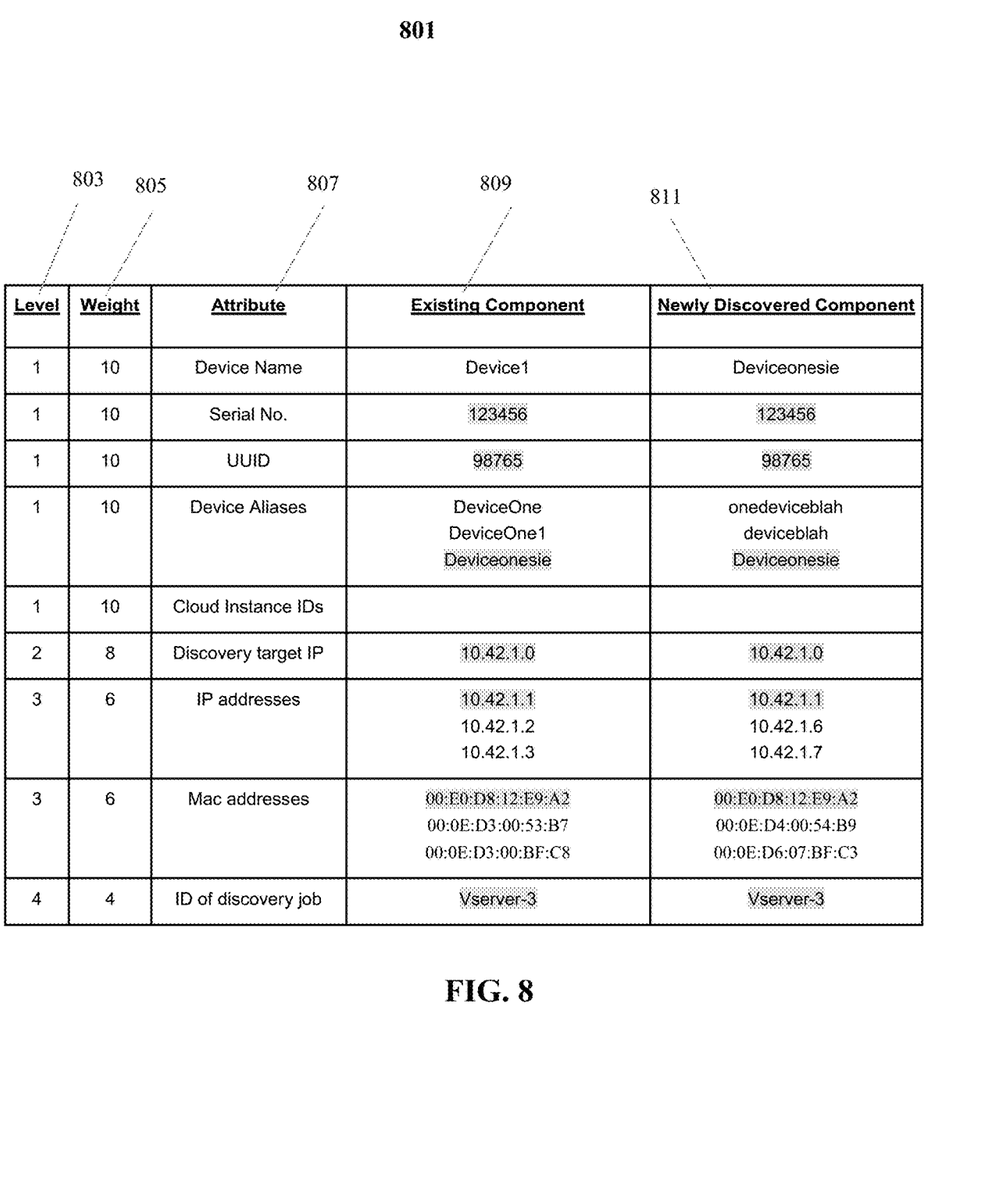
FIG. 8 illustrates an exemplary dataset, in accordance with an embodiment.

Referring now to FIG. 8, illustrated is an exemplary dataset 801. As shown, the dataset includes a component newly discovered on, or added to, the system, newly discovered component 811. Newly discovered component 811 is compared to existing component 809, which is a component found to be already on the system, as in step S209.

Additional columns include attribute 807. Attribute 807 contains numerous attributes/criteria for component(s), including, but not limited to, device name, serial number, or any suitable attribute, as illustrated above in Table 2.

Level 803, which provides the numeric Level number for each associated attribute 807, is also associated with the Weight rating 805 for each of the attributes.

As shown in FIG. 8, highlighted components are those that are identified by the system to be fields that match between existing component 809 and newly discovered component 811.

Thus, in accordance with an embodiment, since there is at least one matching attribute between 811 and 809, a score is calculated at S213.

In S303, a point score is calculated for each level. Referring to 801, for Level 1, there are three matches (serial number, UUID, and device aliases). Since there are three matching attributes, the Level score is calculated by taking the number of matches (3) multiplied by the Level value (10), and then adding the Level value (10) (e.g. (3×10)+10), with a total Level value for Level 1 of 40.

Continuing with 801, Level 2 attributes have only one match, the discovery target IP. Since there is only one match, the level score is calculated by multiplying the number of matches (1) by the level value (8), to arrive at a Level value of 8 for Level 2.

Level 3 attributes have two matches: IP address and MAC address. Utilizing the same formula as in Level 2, since there are less than two matches, the number of matches (2) is multiplied by the Level value (6), with a total value for Level 3 of 12.

Level 4 attributes have one match, so the number of matches (1) is multiplied by the Level value (4), for a total of 4.

In step S305, a final match score is calculated by adding the Level values calculated above. In 801, the total match score is 40+8+12+4, for a total of 64. Additionally, since each Level of Levels 1-4 had at least one match, no deductions occurred.

Based on any selected matching aggressiveness level, the total of 64 exceeds even the maximum aggressiveness level of 30. Therefore, the system determines, in 801, that components 811 and 809 are indeed a match. Once this is determined, newly discovered component 811's data is merged into existing component 809 on the system.

Figure 9:
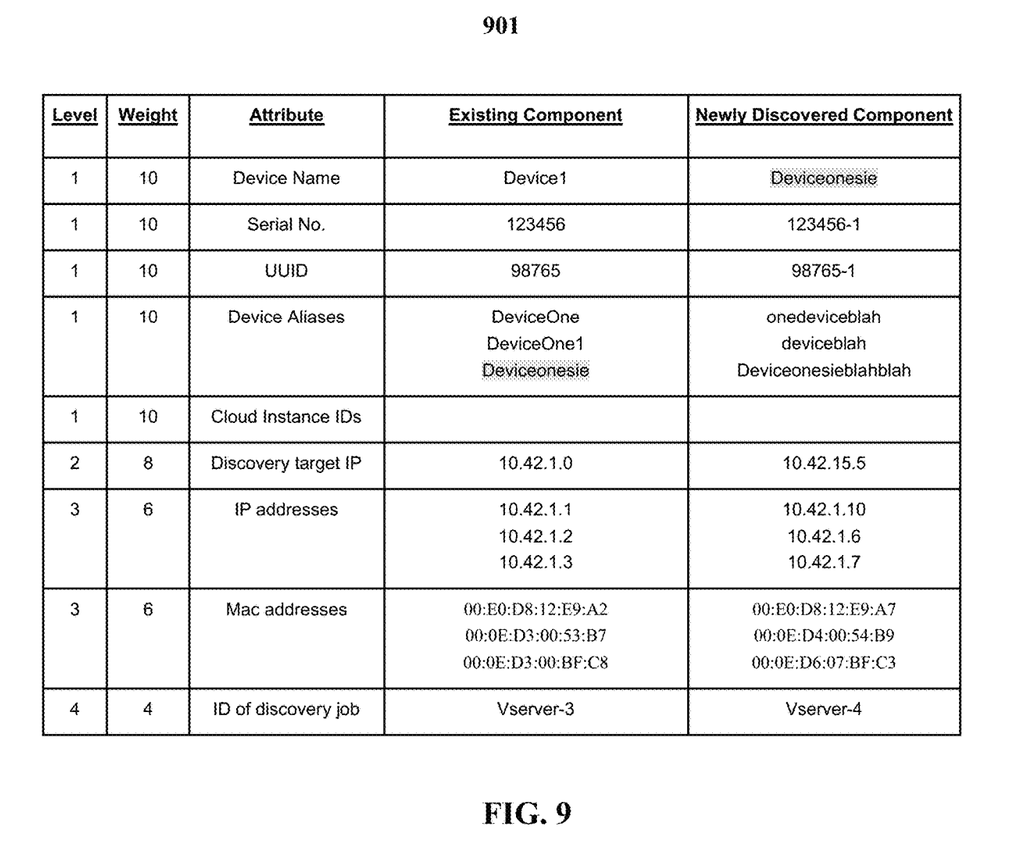
FIG. 9 illustrates an exemplary dataset, in accordance with an embodiment.

FIG. 9 illustrates an exemplary dataset 901.

Dataset 901 includes many of the same features as dataset 801. In this dataset, only one match exists between components 811 and 809. Here, the match is not across the same attribute, but is instead between a device name (for newly discovered component 811) and device alias (for existing component 809). Thus, the score calculated in S213 is the number of matches (1) multiplied by the level value (10), for a total of 10.

Since dataset 901 has no matches for Levels 2 and 3, a deduction occurs. In accordance with an embodiment, deductions occur when there is a mismatch between two non-equal values, and neither value is null. When there no match at a Level, a deduction is calculated by multiplying −1*level value. Thus, in 901, Level 2 has a deduction of (−8), whereas Level 3 has a deduction of (−6). Level 4 has no match, but no deduction occurs at this level. The system may take into account attributes that are of little importance, except as added weight to a score, and therefore may not be considered for a deduction.

In the embodiment presented in 901, at step S305, a final score is calculated. Here, Level 1 has a score of 10, Level 2 has −8, Level 3 has −6, and Level 4 has 0, for a total score of −4. Based on the negative score, the match score will necessarily be less than any matching aggressiveness score. Therefore, the embodiment in dataset 901 proceeds to process S601 for analyzing and matching unprocessed devices, for further intervention.

Figure 10:
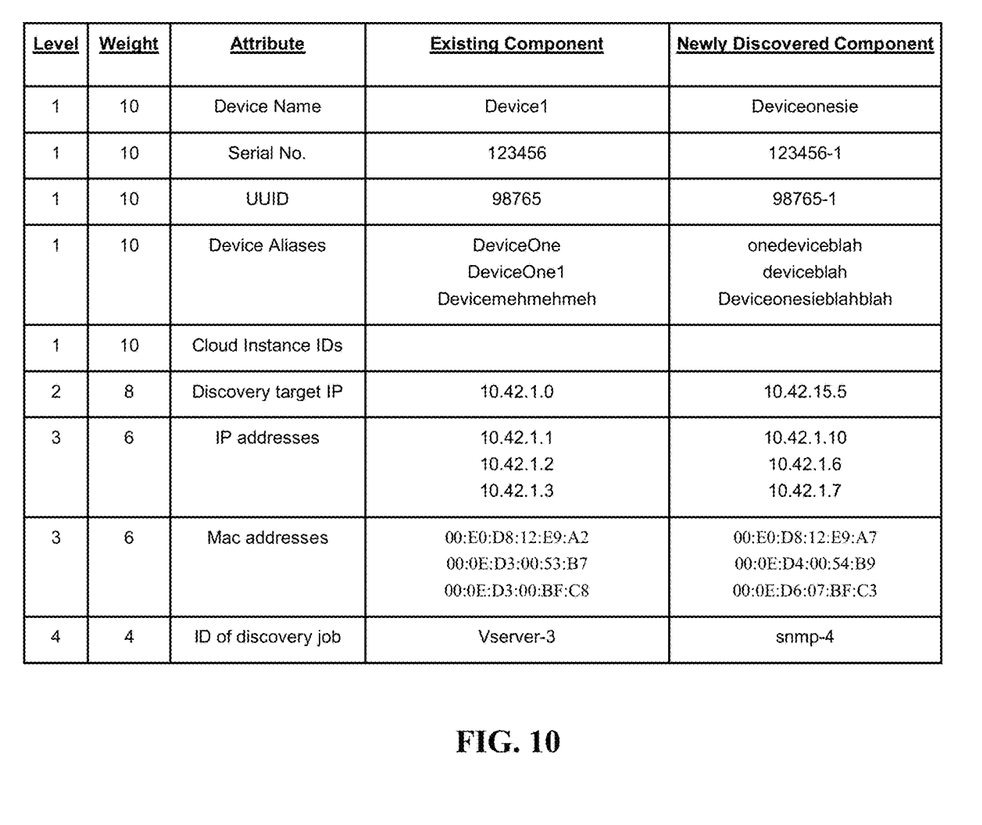
FIG. 10 illustrates an exemplary dataset, in accordance with an embodiment.

FIG. 10 illustrates an example of a determination at S209 that no matching component candidates currently exist on the system. As shown, there are no commonly identified attributes between the existing component and newly discovered component. In this scenario, the process continues to S211, and creates a new component on the system for the newly discovered component.

Figure 11:
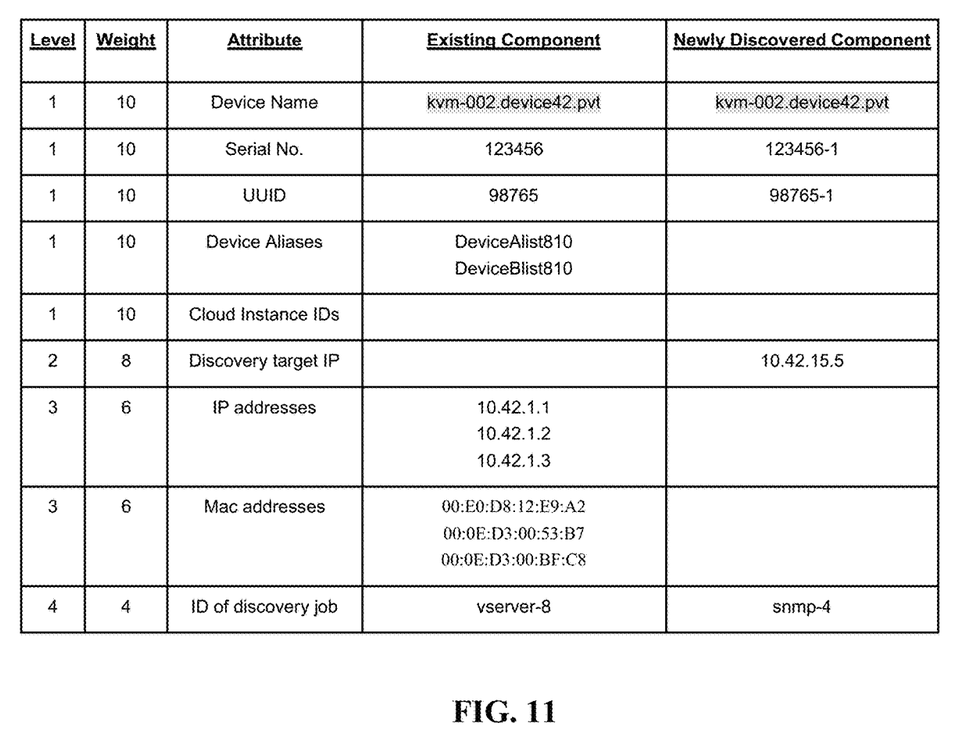
FIG. 11 illustrates an exemplary dataset, in accordance with an embodiment.

FIG. 11 illustrates an example where Levels 2, 3 and 4 have no matches. However, as shown for each of Levels 2 and 3, one of the two components has no value (a NULL value), and therefore, no deduction occurs for Levels 2 and 3. The total score in FIG. 11 is 10 for Level 1, 0 for Levels 2 and 3, and −4 for Level 4 (since there is no NULL value, but no match, it is a deduction of 4), for a total score of 6. Accordingly, in this scenario, there would be further processing at S601.

It should be understood that various components of the disclosed subject matter may communicate with one another in various manners. For instance, components may communicate with one another via a wire or, alternatively, wirelessly and by electrical signals or via digital information]

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A component discovery process, comprising:
searching a network system for potential matching components;
calculating, via a processor, a match score;
determining if the potential matching component is a new or existing device, wherein the
determining comprises comparing the match score to a predetermined matching aggressiveness level; and
wherein, if the match score is less than the matching aggressiveness level value, recording the potential matching component as an unmatched device, and flagging the component for further processing.

2. The process of claim 1, wherein the searching comprises:
receiving a component determined to be a potentially new component on the system; and
receiving at least one potentially matching component already registered on the system.

3. The process of claim 2, further comprising determining if at least one attribute of the potentially new component matches at least one attribute of the already registered component.

4. The process of claim 1, wherein the system is searched for potential matching components, based on a plurality of attributes.

5. The process of claim 2, wherein at least one of the plurality of attributes matches.

6. The process of claim 2, wherein the attributes are selected from a group consisting of device name, serial number, and device alias.

7. The process of claim 2, wherein the attributes are selected from a group consisting of discovery target internet protocol (IP), IP address, media access control (MAC) address and identification of discovery job.

8. The process of claim 1, wherein the calculating the match score further comprises calculating a score each potential match in the system.

9. The process of claim 1, wherein the calculating the match score further comprises calculating a point total for each match level.

10. The process of claim 9, further comprising match levels 1-4.

11. The process of claim 9, further comprising calculating a final match score.

12. The process of claim 11, wherein the final match score is calculating by summing all match level calculations.

13. The process of claim 1, wherein, if the match score is greater than the matching aggressiveness level value, the system records a match.

14. The process of claim 13, wherein the potential matching component is a first potential matching component recorded as a first match, the process further comprising a second potential matching component recorded as a second match, the process further comprising performing a tie-breaker calculation.

15. A method for executing a component discovery process, comprising the steps of: searching a system for potential matching components, the searching comprising:
- receiving a component determined to be a potentially new component on the system;
- receiving at least one potentially matching component already registered on the system; and
- determining if at least one attribute of the potentially new component matches at least one attribute of the already registered component;
- assigning a match level to each attribute, the match level associated with a value, wherein the match level corresponds to levels 1-4;
- calculating a match score for each of levels 1-4, the calculating comprising:
  - calculating a first score for the matching attributes in level 1, wherein each matching attribute in level 1 is assigned a value of 10;
  - calculating a second score for the matching attributes in level 2, wherein each matching attribute in level 2 is assigned a value of 8;
  - calculating a third score for the matching attributes in level 3, wherein each matching attribute in level 3 is assigned a value of 6;
  - calculating a fourth score for the matching attributes in level 4, wherein each matching attribute in level 4 is assigned a value of 4;
- calculating a final match score, the final match score being calculated by summing all match level calculations; and
- comparing the calculated final match score with a configured matching aggressiveness level.

16. The calculating a match score of claim 15, wherein the calculating further comprises utilizing the following formula for calculating each level score:
- If>2 total matches: Per-level score=(#Matches*level value)+level value
- If>0 total matches: Per-level score=(#Matches*level value)
- If=0 total matches: NEW DEVICE; no further calculation needed.

17. The method of claim 15, wherein, if the match score is greater than the matching aggressiveness level value, the system records a match.

18. The method of claim 15, wherein the configured matching aggressiveness level is selected from the group consisting of aggressive, moderate or conservative, with a different value assigned for each level.

19. A component discovery method, comprising:
- searching a system for potential matching components, the searching comprising:
  - receiving a component determined to be a potentially new component on the system;
  - receiving at least one potentially matching component already registered on the system and;
- determining if at least one attribute of the potentially new component matches at least one attribute of the already registered component by calculating a match score and comparing the match score to a predetermined matching aggressiveness level;
- if there is not at least one attribute that matches between the components, determining that the potentially new component is a new component on the system; and
- registering the potentially new component as a new component on the system.

* * * * *